United States Patent
Van Riel et al.

(10) Patent No.: US 8,468,525 B2
(45) Date of Patent: *Jun. 18, 2013

(54) DELAYING INITIATION OF MAINTENANCE PROCESS FOR RUNNING VM BY DELAY VALUE BASED ON RANDOM NUMBER FUNCTION SEEDED WITH UNIQUE ID

(75) Inventors: Henri Han Van Riel, Nashua, NH (US); Daniel Berrange, Cambridge, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/356,250

(22) Filed: Jan. 23, 2012

(65) Prior Publication Data

US 2012/0124577 A1   May 17, 2012

Related U.S. Application Data

(63) Continuation of application No. 11/679,612, filed on Feb. 27, 2007, now Pat. No. 8,112,753.

(51) Int. Cl.
*G06F 9/455* (2006.01)
*G06F 9/46* (2006.01)

(52) U.S. Cl.
USPC ............................ 718/1; 718/102

(58) Field of Classification Search
USPC ...................................... 718/1, 102
See application file for complete search history.

(56) References Cited

U.S. PATENT DOCUMENTS

| | | | |
|---|---|---|---|
| 6,898,702 B1 | 5/2005 | Evans | |
| 7,370,190 B2 | 5/2008 | Calhoon et al. | |
| 7,552,433 B2 * | 6/2009 | Brothers | 718/1 |
| 2005/0207574 A1 | 9/2005 | Pitz et al. | |

OTHER PUBLICATIONS

Dittner et al., Virtualization with Microsoft® Virtual Server 2005, Syngress Publishing, Inc., Chapter 3, pp. 45-110, 2006.*
Jun et al., "The Intel® Random Number Generator", Cryptography Research, Inc., Apr. 22, 1999.*
VMware Communities, "VMware Communities: Start,stop, query about vm's", Oct. 31, 2006.*

* cited by examiner

*Primary Examiner* — Meng An
*Assistant Examiner* — Brian Chew
(74) *Attorney, Agent, or Firm* — Lowenstein Sandler LLP

(57) ABSTRACT

A method of managing resources in a virtual environment based on identifiers is disclosed. The method includes detecting an instantiation of a virtual machine and determining a delay value based on a unique identifier. The method also includes delaying an initiation of at least one support process for the virtual machine by the delay value.

17 Claims, 4 Drawing Sheets

DELAYING INITIATION OF MAINTENANCE PROCESS FOR RUNNING VM BY DELAY VALUE BASED ON RANDOM NUMBER FUNCTION SEEDED WITH UNIQUE ID

REFERENCE TO RELATED APPLICATIONS

This application is a continuation of U.S. patent application Ser. No. 11/679,612, filed on Feb. 27, 2007, the contents of which are incorporated by reference herein.

FIELD

This invention relates generally to multi-user computer systems, more particularly, to methods, apparatus, and systems for managing resources in a virtual environment.

BACKGROUND

Virtual machines are a generally well-known concept. Initially, virtual machine (or hardware virtual machine) can be a single instance of an execution environment that executes on a single computer, where the single computer may execute multiple instances of this execution environment. Each environment also runs an operating system ("OS"). One benefit of this configuration is that it can allow applications written for one OS to be executed on a machine which runs a different OS. This configuration also provides execution "sandboxes" which provide a greater level of isolation between processes than is achieved when running multiple processes on the same instance of an OS. Another benefit for multiple users is that each user has the illusion of having an entire computer, one that is their "private" machine, isolated from other users, all on a single physical machine. Yet another advantage is that booting and restarting a virtual machine can be much faster than with a physical machine, since it may be possible to skip tasks such as hardware initialization. Such software is now often referred to with the terms of virtualization and virtual servers. The host software which provides this capability is often referred to as a virtual machine monitor or hypervisor.

Hardware virtual machines have also led to the application virtual machine. The application virtual machine is a type of virtual machine that is a piece of computer software that isolates the application being used by the user from the computer. Because versions of the virtual machine are written for various computer platforms, any application written for the virtual machine can be operated on any of the platforms, instead of having to produce separate versions of the application for each computer and operating system. The application is run on the computer using an interpreter or Just-In-Time compilation. One example of an application virtual machine is Sun Microsystems's Java Virtual Machine.

Another type of virtual machine is a virtual environment. The virtual environment (sometimes referred to as a virtual private server) is another kind of a virtual machine. In fact, it is a virtualized environment for running user-level programs (i.e. not the OS kernel and drivers, but applications). Virtual environments are created using the software implementing operating system level virtualization approach, such as FreeBSD Jails, Linux-VServer, Solaris Containers, and OpenVZ.

When a virtual machine (or environment) is instantiated within a server, the server also initiates a series of maintenance processes for the instantiated virtual machine. These maintenance processes may occupy a processor for a significant amount of time. Moreover, if multiple virtual machines are instantiated substantially simultaneously, the overall processing speed of the server may be reduced due to the simultaneous instantiation of the multiple sets of maintenance processes.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of multi-user computer systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments relate generally to methods, apparatus, and systems for managing resources in a multi-user system. More specifically, in a virtualized environment, guest operating systems initiate a series of maintenances processes when a virtual machine is invoked. If maintenance processes in multiple virtual machines are being simultaneously instantiated, the system becomes interminably slow because of the all the associated maintenance processes being simultaneously initiated. Accordingly, a delay module may be implemented to delay the start of any secondary processes. The delay module may calculate a random delay based on a unique identifier associated with a virtual machine. For example, the unique identifier may be the universal unique identifier ("UUID") or global unique identifier ("GUID"). The use of random delays are to ensure that the maintenance tasks on all the virtual machines do not run simultaneously, thereby distributing the server resources. Moreover, the random delay is guaranteed to be different between the virtual machines but yet always the same for each virtual machine.

Figure 1:
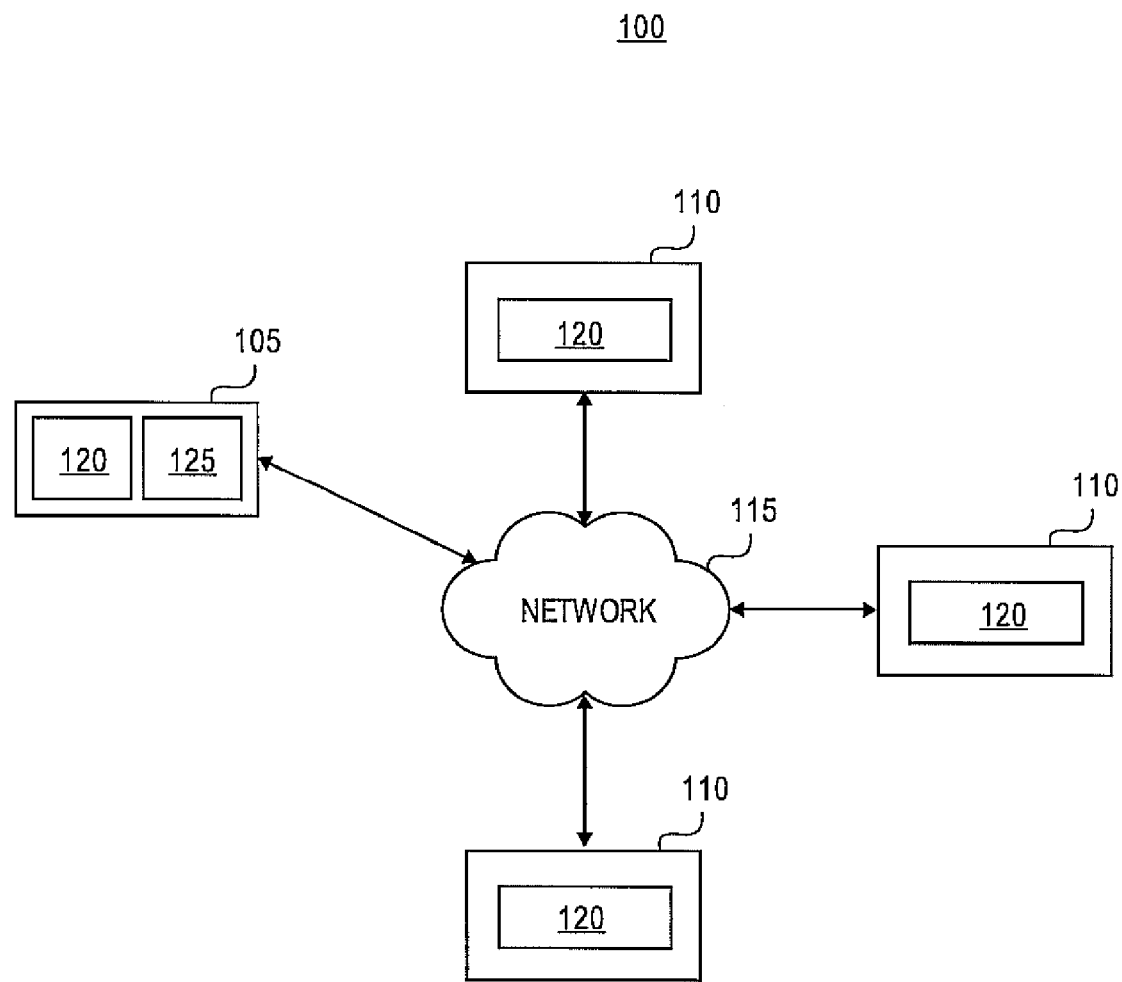
FIG. 1 illustrates an exemplary system in accordance with an embodiment.

FIG. 1 illustrates an exemplary system 100 in accordance with an embodiment. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the system 100 includes a server 105, clients 110 and a local network 115. The server 105 may be a computing machine or platform configured to execute a multiple user operating system 120 in conjunction with the clients 110. The server 105 may be implemented with server platforms as known to those skilled in the art from Intel, Advanced Micro Devices, Hewlett-Packard, Transmeta, etc.

The server 105 may interact with the clients over the local network 115. The local network 115 may be a local area network implementing an established network protocol such as Ethernet, token ring, FDDI, etc. The local network 115 provides a communication channel for the server 105 and clients 110 to exchange data and commands.

The clients 110 may be computing machine or platform configured to execute secure and open applications through the multi-user operating system 120. The clients 110 may be implemented with personal computers, workstations, thin clients, thick clients, or other similar computing platform. The clients 110 may use operating systems such as Linux, Windows, Macintosh or other available multi-user operating system.

In some embodiments, the server 105 may execute a delay process 125. The delay process 125 may be configured to be invoked as part of the instantiation of a virtual machine. The delay process 125 may also be configured to retrieve a unique identifier from the instantiated virtual machine. In one embodiment, the unique identifier may be Universally Unique Identifier (UUTD). While in other embodiments, the unique identifier may be a global unique identifier (GUID) or other similar identifier that can be uniquely associated with a virtual machine.

The delay process 125 may then calculate a delay value based on a random number function with the seed value of the unique identifier. Since random number generators are partially deterministic, the use of the same seed value generates a predictable value for each instance of a virtual machine. However the delay values are different between the virtual machines. Accordingly, the delay process 125 may be configured to delay the start of the associated maintenance or other related processes to the virtual machine may be delayed by the generated delay value. Thus, the load of server is more evenly distributed as the initiation of the maintenance processes are delayed by a different value. Although embodiments generally relate to a virtual environment, other embodiments of the invention may be implemented in situation were the invocation of a process causes the initiation of multiple secondary processes.

Figure 2:
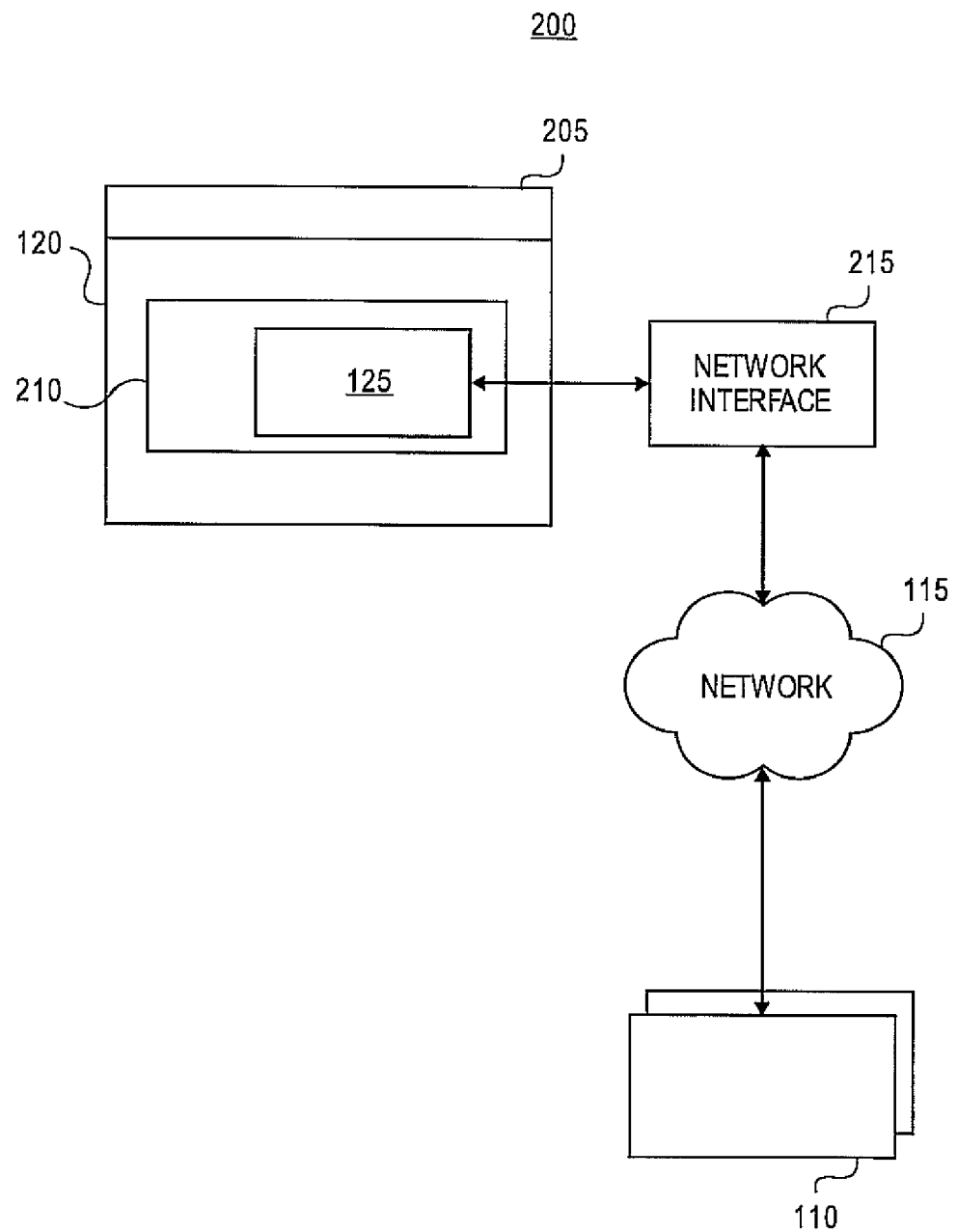
FIG. 2 illustrates an exemplary block diagram in accordance with another embodiment.

FIG. 2 illustrates an exemplary software environment 200 being executed by the server 105 in accordance with an embodiment. It should be readily apparent to those of ordinary skill in the art that the software environment 200 depicted in FIG. 2 represents a generalized schematic illustration and that other components may be added or existing components may be removed or modified.

As shown in FIG. 2, the software environment 200 may include an operating system 120. The operating system 120 may be a version of a LINUX™, UNIX™, or similar multi-user operating system. A run-time environment 205 may be configured to execute on the operating system 120. The run-time environment 205 may provide a set of software that supports the execution of applications/programs. The run-time environment 205 may include an application program interface ("API", not shown). The API may be configured to provide a set of routines that an application uses to request and carry out lower-level services performed by the operating system 120. The operating system 120 may include a kernel 210. The kernel 210 may be configured to provide secure access to the underlying hardware of a processor. The kernel 210 may also be configured to interface with the network interface 215 for access to the network 115.

Figure 3:
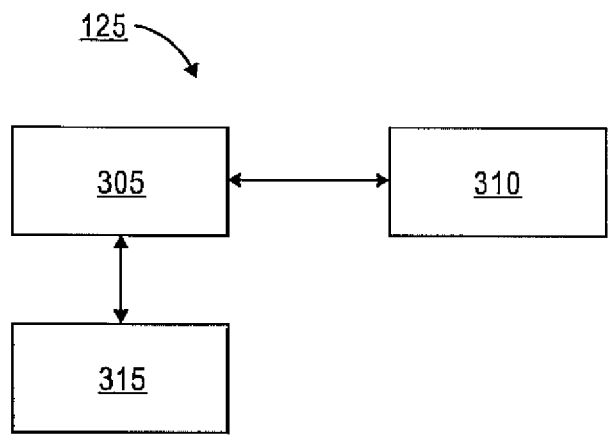
FIG. 3 illustrates a more detailed block diagram of the delay process in accordance with yet another embodiment.

The kernel 210 may also execute the delay process 125. The delay process 125 may be configured to execute as a background process and monitor for the instantiation of virtual machines at the clients 110 or may be invoked in response to the instantiation of a virtual machine. FIG. 3 illustrates a more detailed block diagram of the delay process 125.

As shown in FIG. 3, the delay process 125 may include a control module 305, a random number generator module 310, and an interface 315. The control module 305 may be configured to provide the command and data control that implements the functionality of the delay process 125. The control module 305 may be implemented in software (an application program, a main routine, etc.) or in hardware (field programmable gate array ("FPGA"), application specific integrated circuit ("ASIC"), etc.).

The control module 305 may be configured to couple with a random number generator module 310. The random number generator module 310 may be configured to generate a random number based on a seed value provided by the control module 305. The random number generator module 310 may be implemented in software (e.g., a function call, a subroutine, etc.) or in hardware (FPGA, ASIC, etc.) as known to those skilled in the art. The random number generator module 310 may also be implemented as a hash function in some embodiments.

The control module 305 may also be configured to couple with the interface 315. The interface 315 may provide a Communication channel for invoked virtual machine to invoke the delay process 125 and to retrieve their respective unique identifier.

Figure 4:
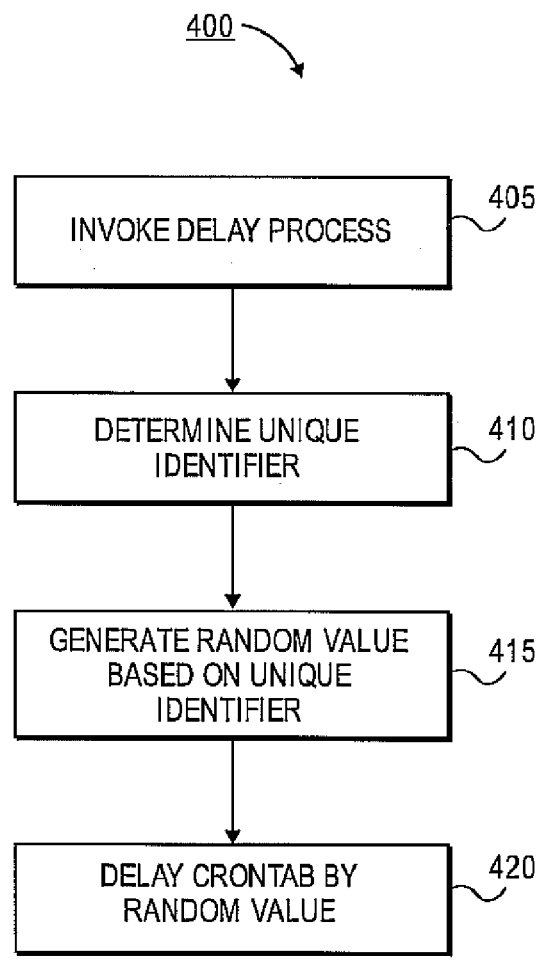
FIG. 4 illustrates an exemplary flow diagram in accordance with yet another embodiment.

FIG. 4 illustrates an exemplary flow diagram 400 implemented by the control module 305 delay process 125 in accordance with another embodiment. It should be readily apparent to those of ordinary skill in the art that the flow diagram 400 depicted in FIG. 4 represents a generalized schematic illustration and that other steps may be added or existing steps may be removed or modified.

As shown in FIG. 4, in step 405, the control module 305 of the delay process 125 may be invoked as part of the start-up process of an invoked virtual machine. In step 410, the control module 305 may retrieve a unique identifier associated with the instantiated virtual machine. More particularly, the control module 305 may send a query message to the instantiated virtual machine over the interface 315 to request the unique identifier. This identifier may be a UUID, GUID, or other one-of-kind identifier associated with the instantiated virtual machine. In some embodiments, the UUID may exist inside the invoked virtual machine in an emulated BIOS area or hypervisor data area.

In step 415, the control module 305 may calculate a delay value. More particularly, the control module 305 may seed the random number generator module 310 with the unique identifier to generate a delay value that is random from other instantiated virtual machines. However, since random number generators are ultimately deterministic, they tend to generate a predictable sequence for the same seed value. Accordingly, each virtual machine tends to generate the same delay value for itself.

In some embodiments, the delay value may be restricted to a certain range of acceptable delays. More particularly, a modulo arithmetic operation may be performed on the delay value to limit the delay value. An example of modulo arithmetic operation can be [MAXDELAY 3600; DELAY=$ ((RANDOM % MAXDELAY))].

In step 420, the control module 305 may be configured to delay any associated maintenance or secondary processes associated with the instantiated virtual machine by the calculated delay value.

Figure 5:
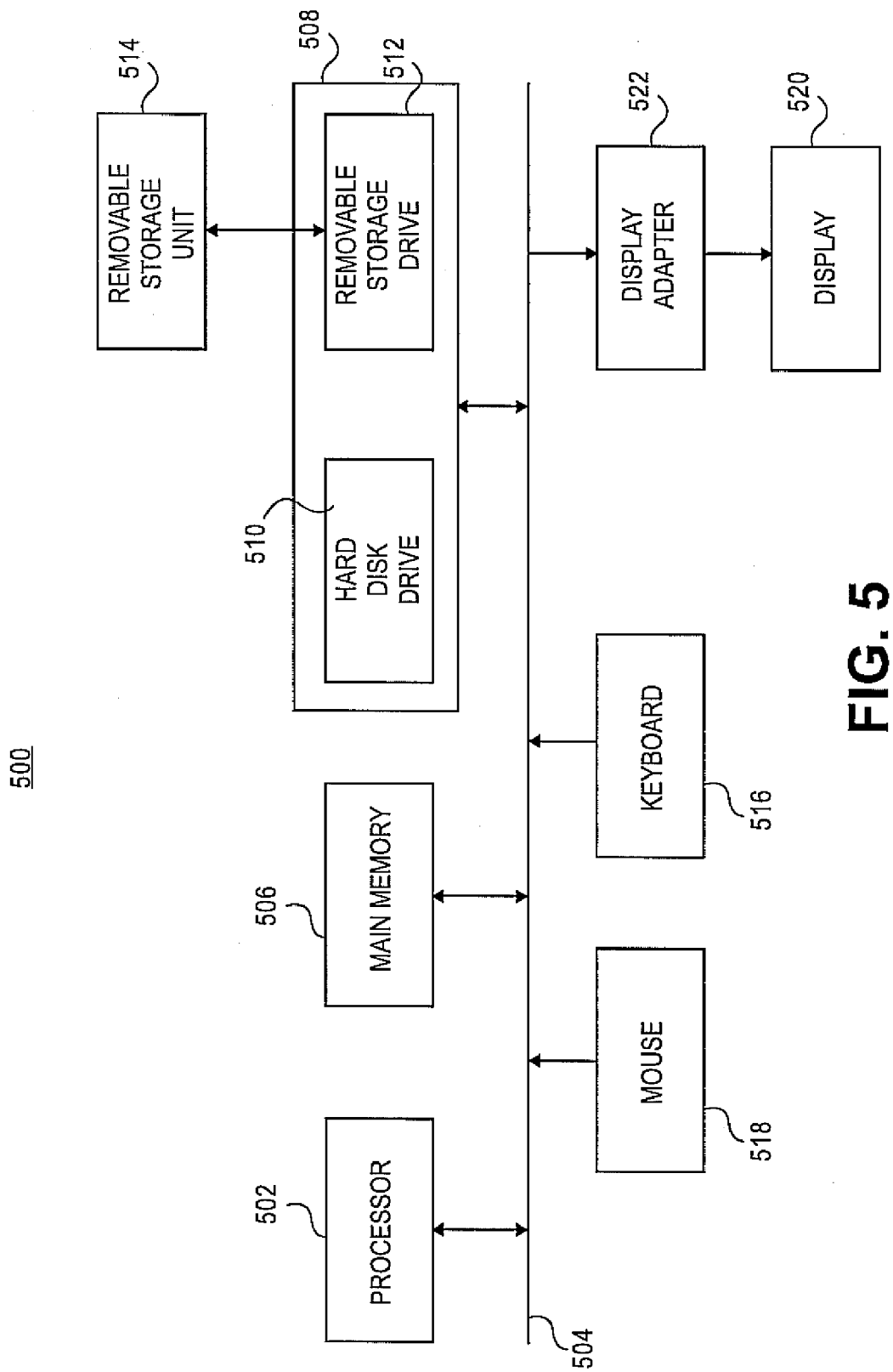
FIG. 5 illustrates an exemplary computing platform in accordance with yet another embodiment.

FIG. 5 illustrates an exemplary block diagram of a computing platform 500 where an embodiment may be practiced. The functions of the operating system and delay process may be implemented in program code and executed by the computing platform 500. The operating system and delay process may be implemented in computer languages such as PASCAL, C++, JAVA, etc.

As shown in FIG. 5, the computer system 500 includes one or more processors, such as processor 502 that provide an execution platform for embodiments of the operating system and delay process. Commands and data from the processor 502 are communicated over a communication bus 504. The computer system 500 also includes a main memory 506, such as a Random Access Memory (RAM), where the operating system and delay process may be executed during runtime, and a secondary memory 508. The secondary memory 508 includes, for example, a hard disk drive 510 and/or a removable storage drive 512, representing a floppy diskette drive, a magnetic tape drive, a compact disk drive, etc., where a copy of a computer program embodiment for the operating system and delay process may be stored. The removable storage drive 512 reads from and/or writes to a removable storage unit 514 in a well-known manner. A user interfaces with the operating system and delay process with a keyboard 516, a mouse 518, and a display 520. A display adapter 522 interfaces with the communication bus 504 and the display 520. The display adapter also receives display data from the processor 502 and converts the display data into display commands for the display 520.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
   determining a unique identifier associated with a running virtual machine;
   generating a delay value based on a random number function that is at least partially deterministic and that is seeded with a unique identifier associated with the running virtual machine; and
   delaying, by a processor, an initiation of a maintenance process for the running virtual machine by the delay value.

2. The method of claim 1, wherein the unique identifier comprises a universal unique identifier.

3. The method of claim 1, wherein the unique identifier comprises a global unique identifier.

4. The method of claim 1, further comprising:
   assigning second delay value to a second running virtual machine.

5. The method of claim 4, wherein the second delay value is different than the delay value.

6. The method of claim 1, wherein determining the unique identifier associated with the running virtual machine comprises:
   querying the running virtual machine for the unique identifier.

7. A system comprising:
   a memory to store a plurality of unique identifiers;
   a processor, coupled to the memory to:
   determine a unique identifier associated with a running virtual machine;
   generate a delay value based on a random number function that is at least partially deterministic and that is seeded with a unique identifier associated with the running virtual machine; and
   delay an initiation of a maintenance process for the running virtual machine by the delay value.

8. The system of claim 7, wherein the unique identifier comprises a universal unique identifier.

9. The system of claim 7, wherein the unique identifier comprises a global unique identifier.

10. The system of claim 7, wherein the processor is further to:
    assign second delay value to a second running virtual machine.

11. The system of claim 10, wherein the second delay value is different than the delay value.

12. The system of claim 7, wherein determining the unique identifier associated with the running virtual machine comprises:
    querying the running virtual machine for the unique identifier.

13. A non-transitory machine-readable storage medium including data that, when accessed by a processor, cause the processor to perform operations comprising:
    determining a unique identifier associated with a running virtual machine;
    generating a delay value based on a random number function that is at least partially deterministic and that is seeded with a unique identifier associated with the running virtual machine; and
    delaying, by the processor, an initiation of a maintenance process for the running virtual machine by the delay value.

14. The non-transitory machine-readable storage medium of claim 13, wherein the unique identifier comprises at least one of a universal unique identifier or a global unique identifier.

15. The non-transitory machine-readable storage medium of claim 13, wherein the operations further comprise:
assigning second delay value to a second running virtual machine.

16. The non-transitory machine-readable storage medium of claim 15, wherein the second delay value is different than the delay value.

17. The non-transitory machine-readable storage medium of claim 13, wherein determining the unique identifier associated with the running virtual machine comprises:
querying the running virtual machine for the unique identifier.

* * * * *